Feb. 22, 1949.  F. N. SMITH  2,462,565
ONE-WAY EXPANSIBLE BAND BRAKE
Filed Aug. 13, 1946
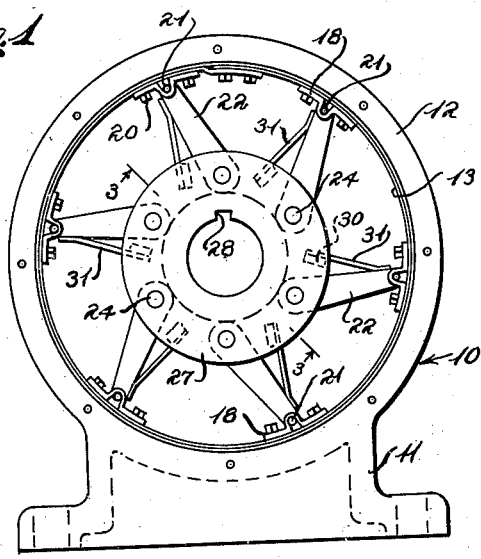
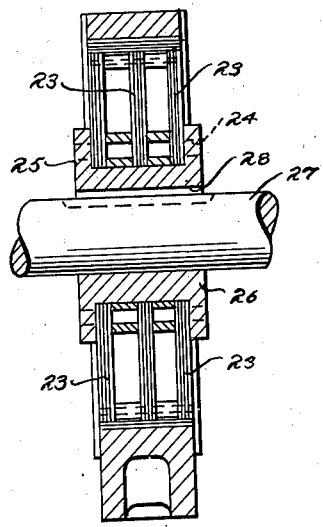
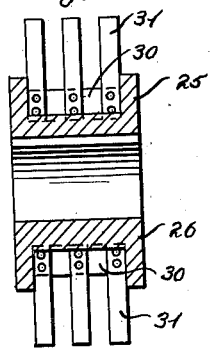
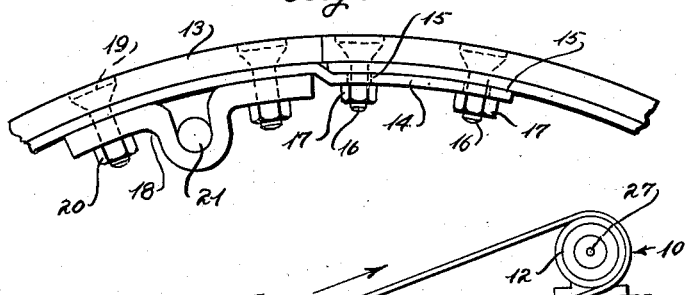
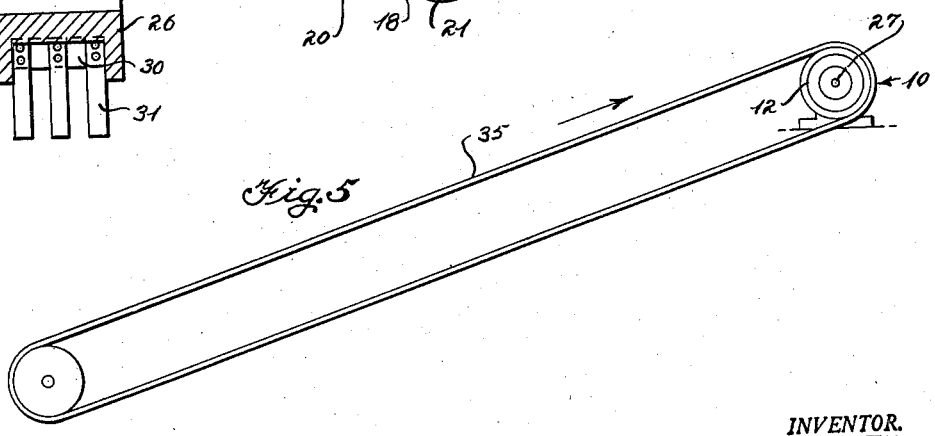
INVENTOR.
FRANKLIN N. SMITH
BY
ATTORNEYS

Patented Feb. 22, 1949

2,462,565

UNITED STATES PATENT OFFICE 2,462,565

ONE-WAY EXPANSIBLE BAND BRAKE

Franklin N. Smith, Aurora, Ill.

Application August 13, 1946, Serial No. 690,155

2 Claims. (Cl. 188—77)

1

This invention relates to a brake for conveyor belts, and more particularly to such a brake adapted to preclude retrograde motion of the belt upon power failure or the like.

A primary object of this invention is the provision of brake means adapted to be utilized in conjunction with inclined or vertical conveyor belts so constructed that, upon failure of the belt, as from lack of power or other causes, it precludes retrograde or reverse motion of the belt for a period sufficient to enable repairs to be made.

A further object of the invention is the provision of such a device which will be substantially automatic in operation and act promptly upon any tendency of the belt to reverse direction.

A still further object of this invention is the provision of such a device which is sturdy and durable in construction, reliable and efficient in operation, and relatively simple and inexpensive to manufacture, install, assemble and utilize.

Other objects will in part be obvious and in part be pointed out as the description of the invention proceeds, and shown in the accompanying drawings, wherein there is disclosed a preferred embodiment of this inventive concept.

In the drawings:

Figure 1 is a side elevational view of one form of brake embodying features of the instant inventive concept.

Figure 2 is a vertical sectional view taken substantially along the center line of Figure 1.

Figure 3 is a fragmentary sectional view taken substantially along the line 3—3 of Figure 1.

Figure 4 is an enlarged fragmentary view disclosing a constructional detail.

Figure 5 is a diagrammatic view showing the relative positioning of the device in operation.

Similar reference characters refer to similar parts throughout the several views of the drawings.

Referring now to the drawings, there is generally indicated at 10 a housing including a suitable supporting base 11 of any desired conventional configuration, and a circular portion 12 comprising a brake drum, within which is positioned a brake band 13. The brake band 13 is permitted limited expansion and contraction within the drum, means being provided, as best shown in Figure 4, to permit such play. Such means take the form of an offset tongue 14 secured to one end of the lining 13 and extending under the complemental end, the tongue being provided with elongated slots 15, through which extend countersunk bolts 16 provided with nuts 17. Sufficient play is provided to permit relative sliding move-

2 ment of the tongue 14 within the confines of the slots 15, such expansion and contraction being normally sufficient to effect a braking action upon the brake drum.

Secured to the inner side of the brake lining 13 at spaced intervals thereabout are a plurality of brackets 18 and securing means taking the form of countersunk bolts 19 and nuts 20, each of which brackets supports for pivotal movement a shaft 21 serving as a pivot point for one end of an arm 22. Each of the arms 22 is comprised of a plurality of sections 23, as best shown in Figure 2, each connected to a pivot 21, the opposite ends of which arms are connected to a shaft 24 serving as a pivot and journaled in flanges 25 on a circular hub 26. The hub 26 surrounds a shaft 27 for rotation therewith, and is keyed thereto, as by means of a key 28.

Secured between the flanges 25 of hub 24 adjacent each of the arms 22 is a supporting bar 30, to each of which is secured a plurality of spring fingers 31 adapted to bear against each arm 22 at a point adjacent its outer pivoted extremity in such manner as to bias the arms about their respective pivots and expand the brake lining 13. The fingers 31 may be of any desired strength sufficient, when the device is stationary, to bias the lining 13 against the brake drum 12 with sufficient force to prevent retrograde rotation of the shaft 27 and its associated mechanism.

Obviously, upon stoppage of the device for any reason, retrograde motion thereof will be resisted by the expansion of the brake band 13 effected by the spring fingers 31.

Figure 5 discloses in schematic form the application of the device to a conveyor belt 35, in the illustrative form shown, the belt being of the inclined type, and the braking device being installed on the head shaft. Obviously, the device may also be utilized with conveyors of different types, or with other mechanism requiring the stoppage of retrograde rotative movement of the shaft or the like.

From the foregoing it will now be seen that there is herein provided an improved braking device for belt conveyors or the like, which accomplishes all the objects of this invention, and others, including many advantages of great practical utility and commercial importance.

As many embodiments may be made of this inventive concept, and as many modifications may be made in the embodiment hereinbefore shown and described, it is to be understood that

I claim:

1. In a braking device, the combination of a brake drum, an expansible and contractible band therein, a plurality of arms pivotally connected to the inner sides of said band, a shaft extending into said drum, a hub on said shaft, pivotal connections between said hub and the inner ends of said arms, spring means carried by said hub and bearing against each of said arms for biasing said band toward expanded position, and means limiting expansion and contraction of said band, said last-mentioned means comprising a slotted tongue secured to one end of said band and extending beneath the opposite end of said band, and bolts extending into said slot.

2. In a braking device, the combination of a brake drum, an expansible and contractible band in said drum, a plurality of arms pivotally connected to the inner sides of said band, a shaft extending into said brake drum, a hub on said shaft, pivotal connections between said hub and the inner ends of said arms, spring means carried by said hub and bearing against each of said arms for biasing said band toward expanded position, means limiting expansion and contraction of said band including an offset tongue carried by one end of said band and extending under the complemental end thereof, and means for attaching said tongue to said band.

FRANKLIN N. SMITH.

REFERENCES CITED

The following references are of record in the file of this patent:

UNITED STATES PATENTS

| Number | Name | Date |
|---|---|---|
| 247,896 | Ellis | Oct. 4, 1881 |
| 1,881,009 | Winchester | Oct. 4, 1932 |
| 1,912,407 | Sahli | June 6, 1933 |
| 1,996,724 | Hoffer | Apr. 2, 1935 |